Dec. 25, 1962 H. A. TOULMIN, JR 3,070,038
APPARATUS FOR LAND TRANSPORTATION
Original Filed Dec. 7, 1955 8 Sheets-Sheet 1

INVENTOR
HARRY A. TOULMIN, Jr.
BY Toulmin & Toulmin
ATTORNEYS

INVENTOR
HARRY A. TOULMIN, Jr.
BY Toulmin & Toulmin
ATTORNEYS

Dec. 25, 1962  H. A. TOULMIN, JR  3,070,038
APPARATUS FOR LAND TRANSPORTATION
Original Filed Dec. 7, 1955  8 Sheets-Sheet 3
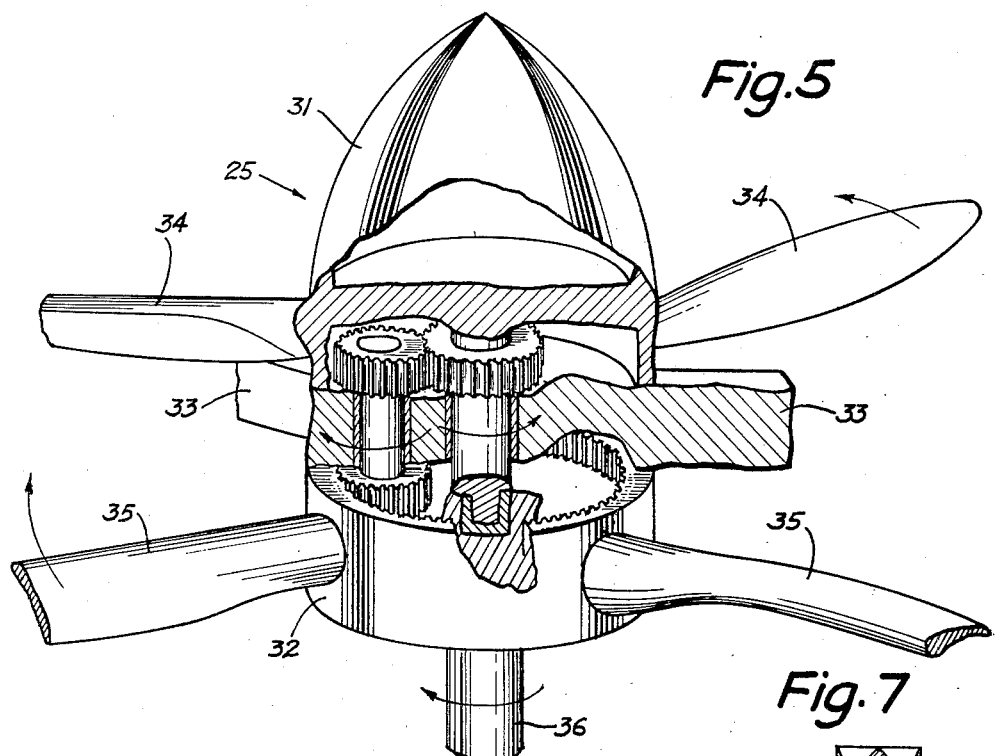
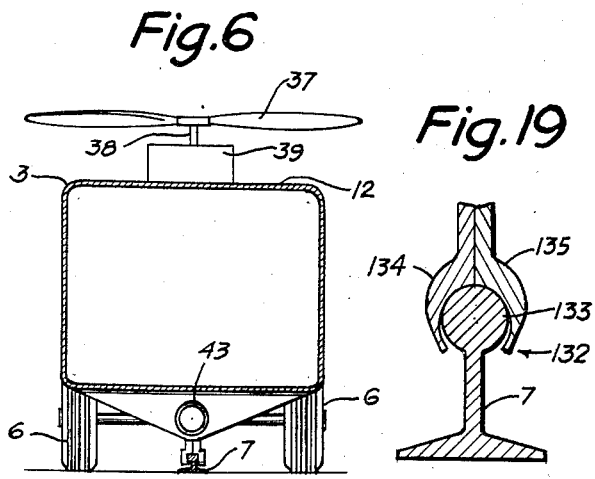
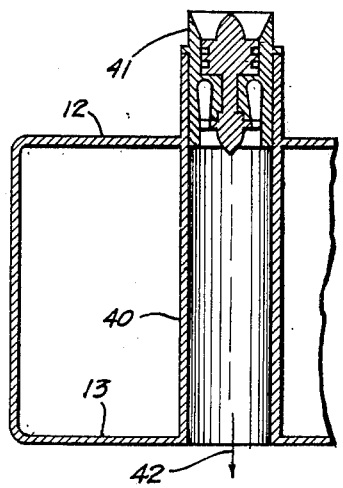
INVENTOR
HARRY A. TOULMIN Jr.
BY Toulmin & Toulmin
ATTORNEYS Dec. 25, 1962 H. A. TOULMIN, JR 3,070,038
APPARATUS FOR LAND TRANSPORTATION
Original Filed Dec. 7, 1955 8 Sheets-Sheet 4
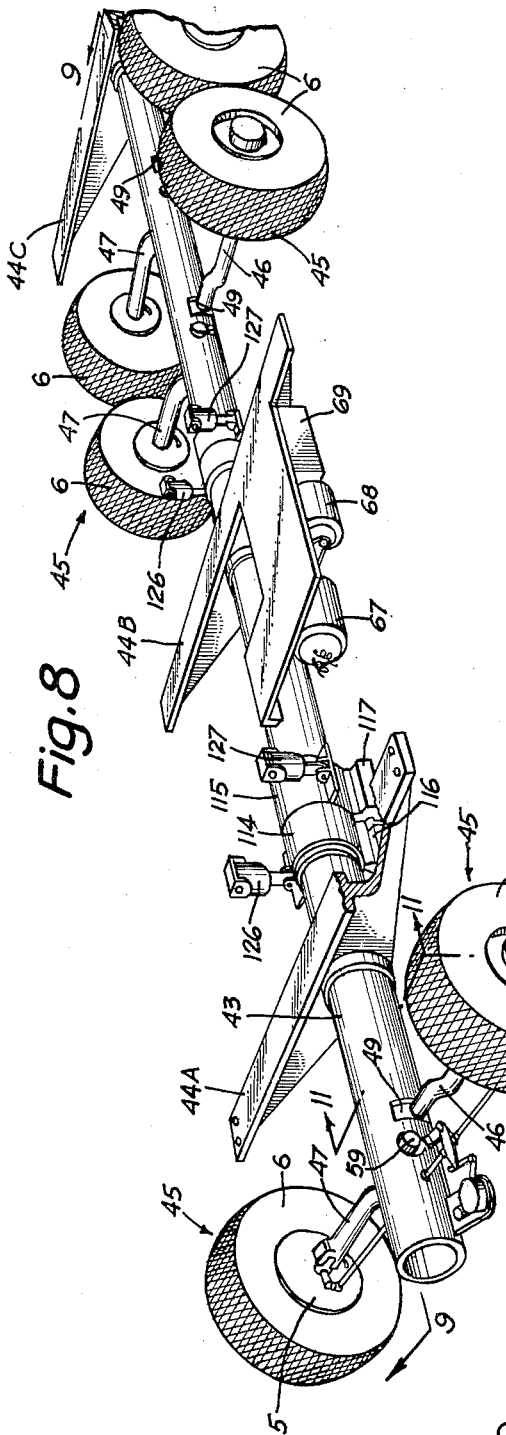
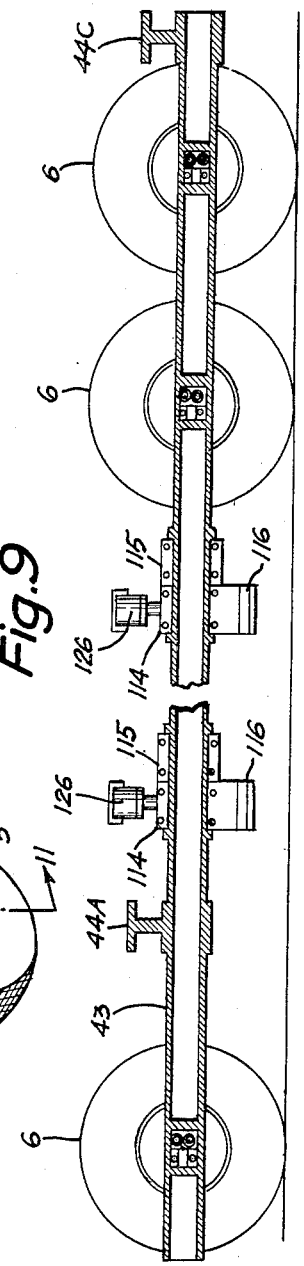
INVENTOR
HARRY A. TOULMIN, Jr.
BY Toulmin & Toulmin
ATTORNEYS

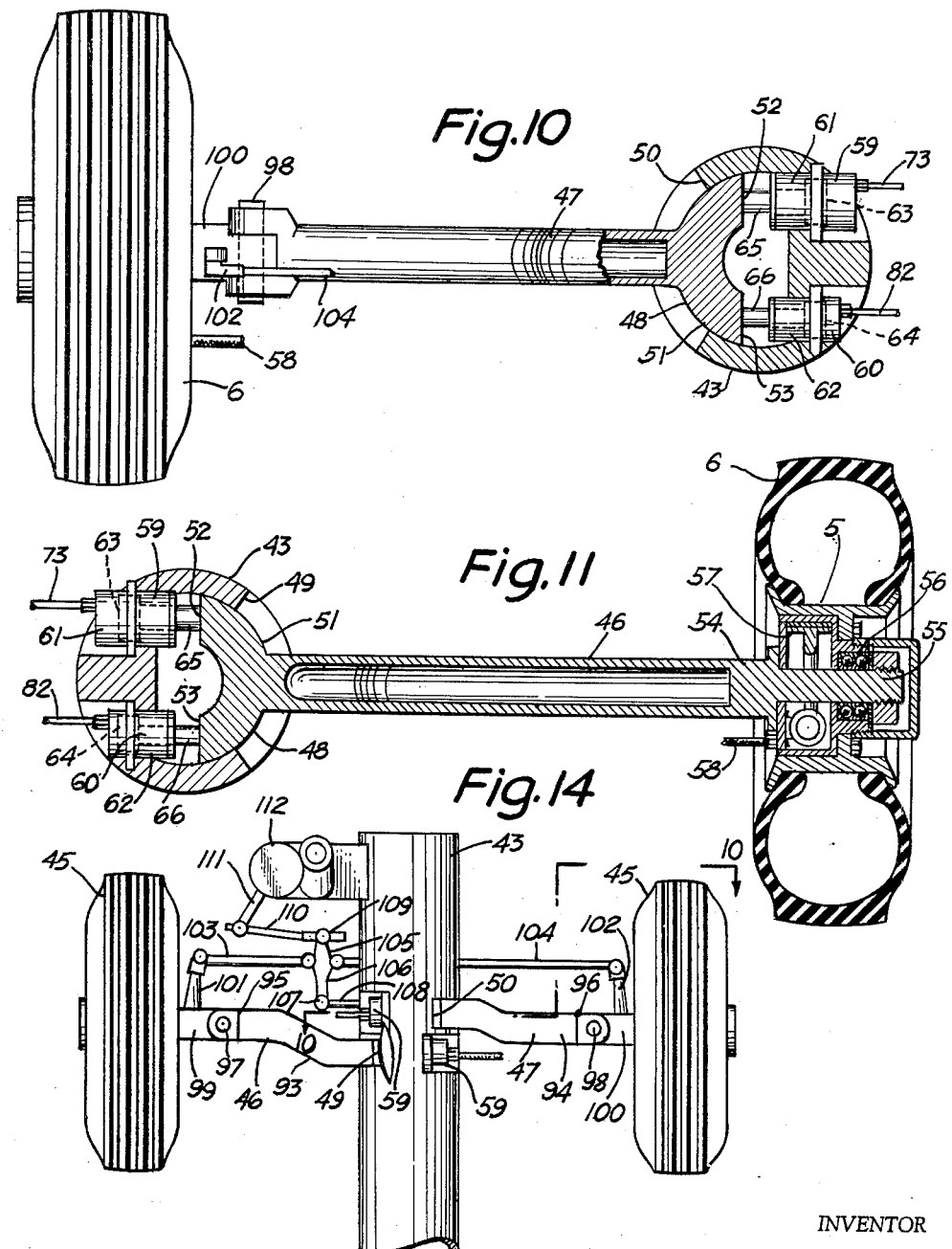

Dec. 25, 1962     H. A. TOULMIN, JR     3,070,038
APPARATUS FOR LAND TRANSPORTATION
Original Filed Dec. 7, 1955     8 Sheets-Sheet 6
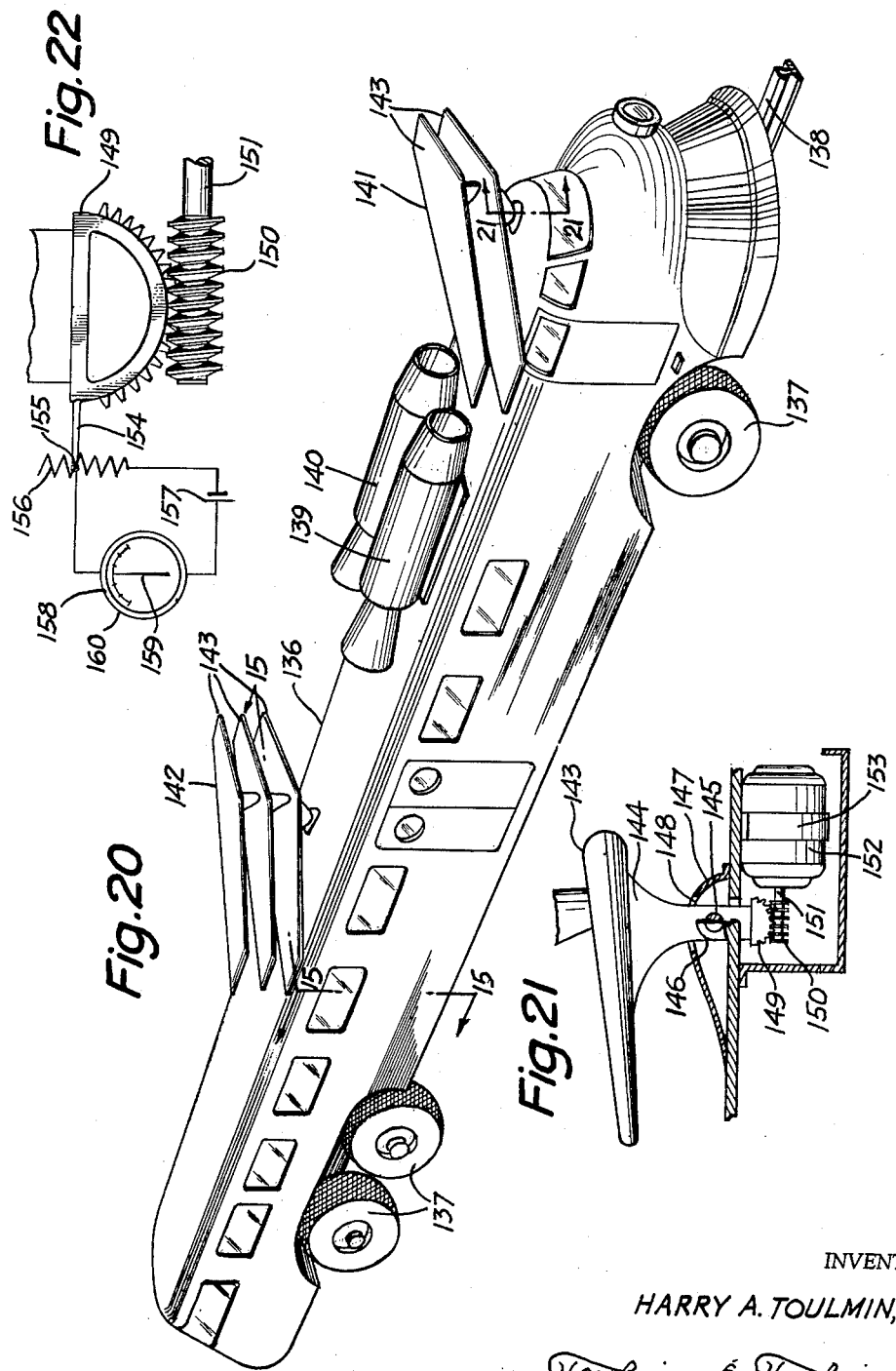
INVENTOR
HARRY A. TOULMIN, Jr.
BY Toulmin & Toulmin
ATTORNEYS Dec. 25, 1962 H. A. TOULMIN, JR 3,070,038
APPARATUS FOR LAND TRANSPORTATION
Original Filed Dec. 7, 1955
8 Sheets-Sheet 7
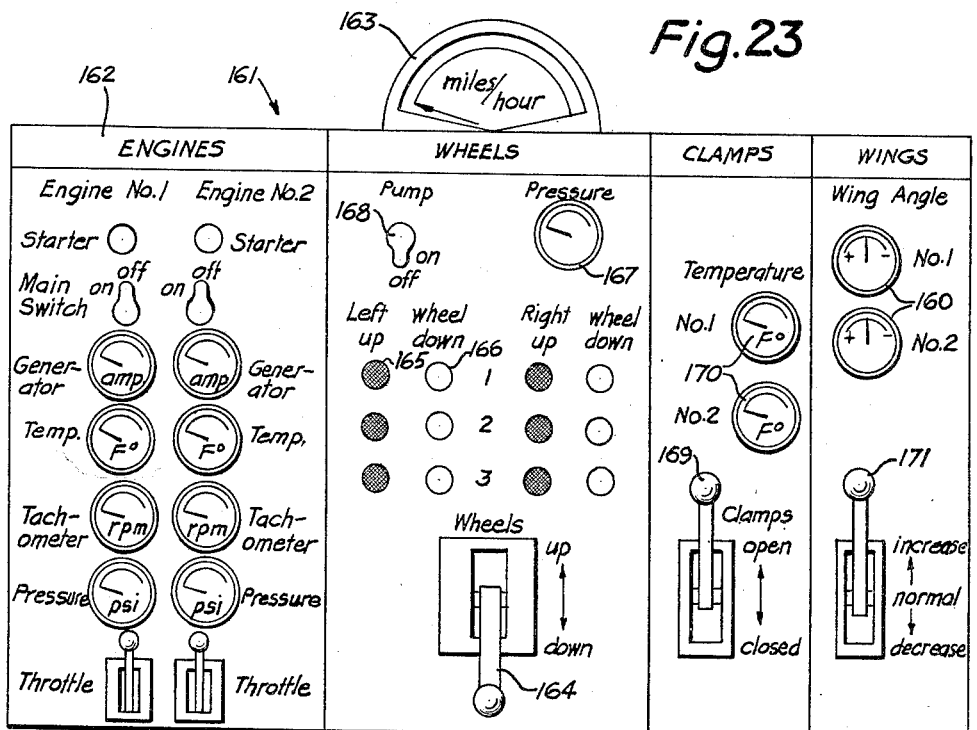
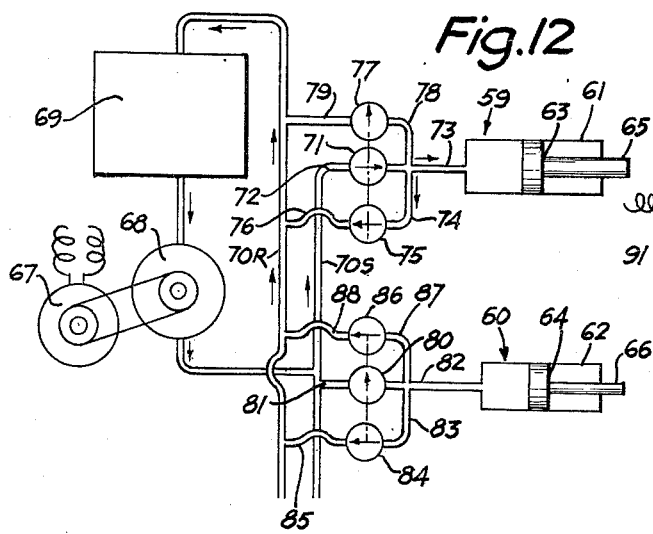
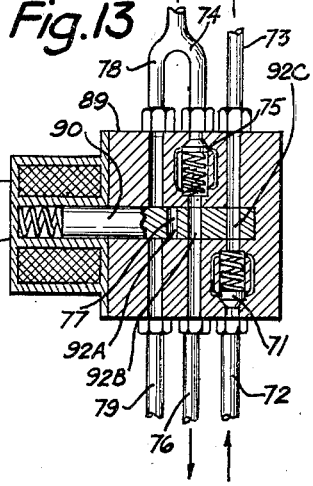
INVENTOR
HARRY A. TOULMIN, Jr.
BY Toulmin & Toulmin
ATTORNEYS

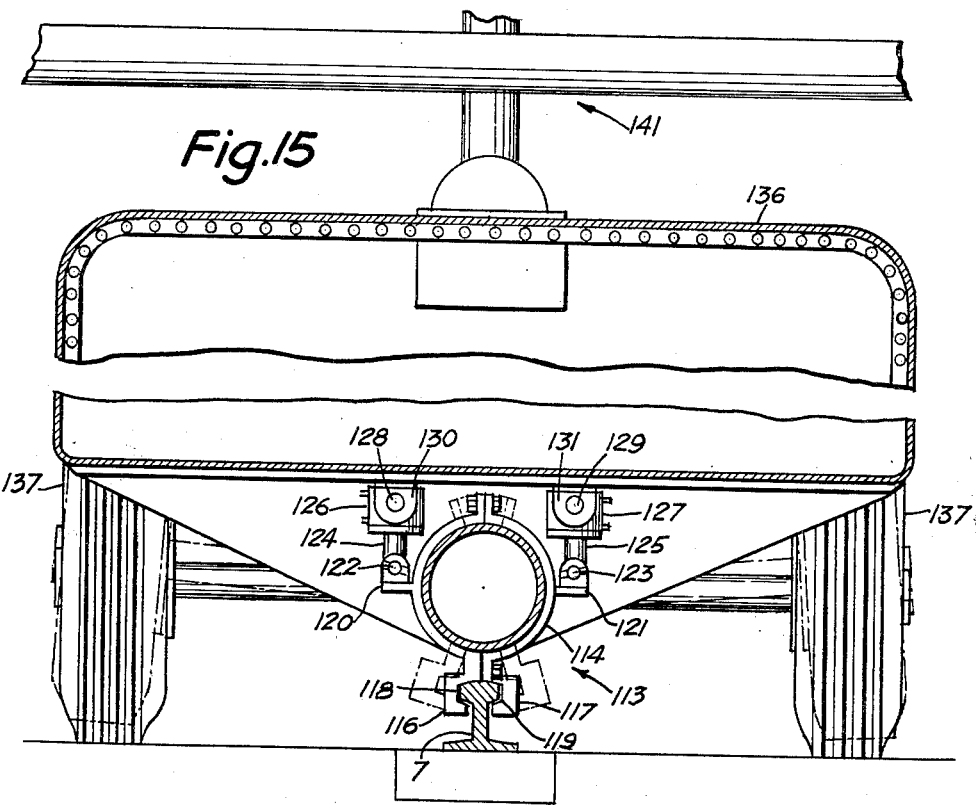

United States Patent Office 3,070,038
Patented Dec. 25, 1962

3,070,038
APPARATUS FOR LAND TRANSPORTATION
Harry A. Toulmin, Jr., Dayton, Ohio, assignor to The Commonwealth Engineering Company of Ohio, Dayton, Ohio
Original application Dec. 7, 1955, Ser. No. 551,662, now Patent No. 2,969,751, dated Jan. 31, 1961. Divided and this application May 16, 1960, Ser. No. 29,426
4 Claims. (Cl. 104—242)

The present invention relates to land transportation, more particularly, to a high speed land vehicle adapted for operation both on a rail or upon a road.

The problem confronting transportation agencies is to provide a vehicle that can travel at high speeds from 100 to 300 miles per hour, which vehicle is also capable of being driven under its own power as a normal vehicle on the highways.

In modern warfare it is expected that in the next war the transport of supplies and personnel must be by vehicles of the highest speed with a minimum necessity for roads and the largest volume of freight and personnel transportation per mile in the shortest possible space of time to meet the expected tactical and strategic situation. This invention is directed to the solution of that problem by having a combined land and air vehicle capable of high speeds without the necessity of highways, elaborate railways or the like.

It is, therefore, the principal object of this invention to provide a vehicle that is both a land vehicle and an air vehicle capable of high speeds and heavy loads and which can be used on highways as well as connected to its guide rail.

It is a further object of the invention to provide a vehicle of great rigidity and strength with a tubular backbone on which is carried the body supporting frame and the articulated axles and wheels as well as means for detachably attaching itself to a single rail to which it is loosely connected to permit of the elevation of the body while it is being driven by its power and guided by the rail.

It is another object of this invention to provide a high speed land vehicle which when traveling upon a rail is adapted for limited vertical movement and which has propeller means for lifting the vehicle when the vehicle is under way.

It is an additional object of this invention to provide a high speed land vehicle having running gear with hydraulic means for resiliently maintaining the axles of the vehicle in laterally extending position, and which means are also adapted for selectively raising or lowering the wheels with respect to the vehicle body.

Other objects and advantages of this invention will become apparent upon reference to the accompanying description when taken in conjunction with the following drawings, wherein:

FIGURE 5 is a perspective view with a portion removed of the propeller hub assembly shown in FIGURE 3;

FIGURE 6 is a sectional view similar to FIGURE 2 and showing a modification in the propeller assembly;

FIGURE 7 is a sectional view similar to that of FIGURE 2 and FIGURE 6 and showing a turbo-jet employed instead of a propeller;

FIGURE 8 is an overall perspective view of the running gear employed on the vehicle of this invention;

FIGURE 9 is a sectional view taken along the lines 9—9 of FIGURE 8;

FIGURE 10 is a front elevational view of the right front wheel of the running gear of FIGURE 8 with a section taken along the lines 10—10 of FIGURE 14;

FIGURE 11 is a front elevational view of the left rear wheel of the running gear shown in FIGURE 8, with a section taken along the lines 11—11 of FIGURE 8;

FIGURE 12 is a schematic view of the hydraulic circuit employed for raising and lowering the wheels;

FIGURE 13 is a vertical sectional view of a control valve used in the circuit shown in FIGURE 12;

FIGURE 14 is a top plan view of the forward portion of the vehicle running gear and showing the right and left front wheels;

FIGURE 15 is a sectional view taken along the lines 15—15 of FIGURE 20;

FIGURES 16-18 are front elevational views of a pair of wheels of the running gear showing the various positions of the wheels and rail clamps;

FIGURE 19 is a vertical sectional view of a modified rail and rail clamps therefor;

FIGURE 20 is an overall perspective view of a modification of the rail vehicle of this invention;

FIGURE 21 is a partial sectional view taken along the lines 21—21 of FIGURE 20;

FIGURE 22 is a schematic view of the indicating circuit attached to the sector gear shown in FIGURE 21; and FIGURE 23 is a front elevational view of the instrument panel employed in the vehicle of this invention.

Figure 1:
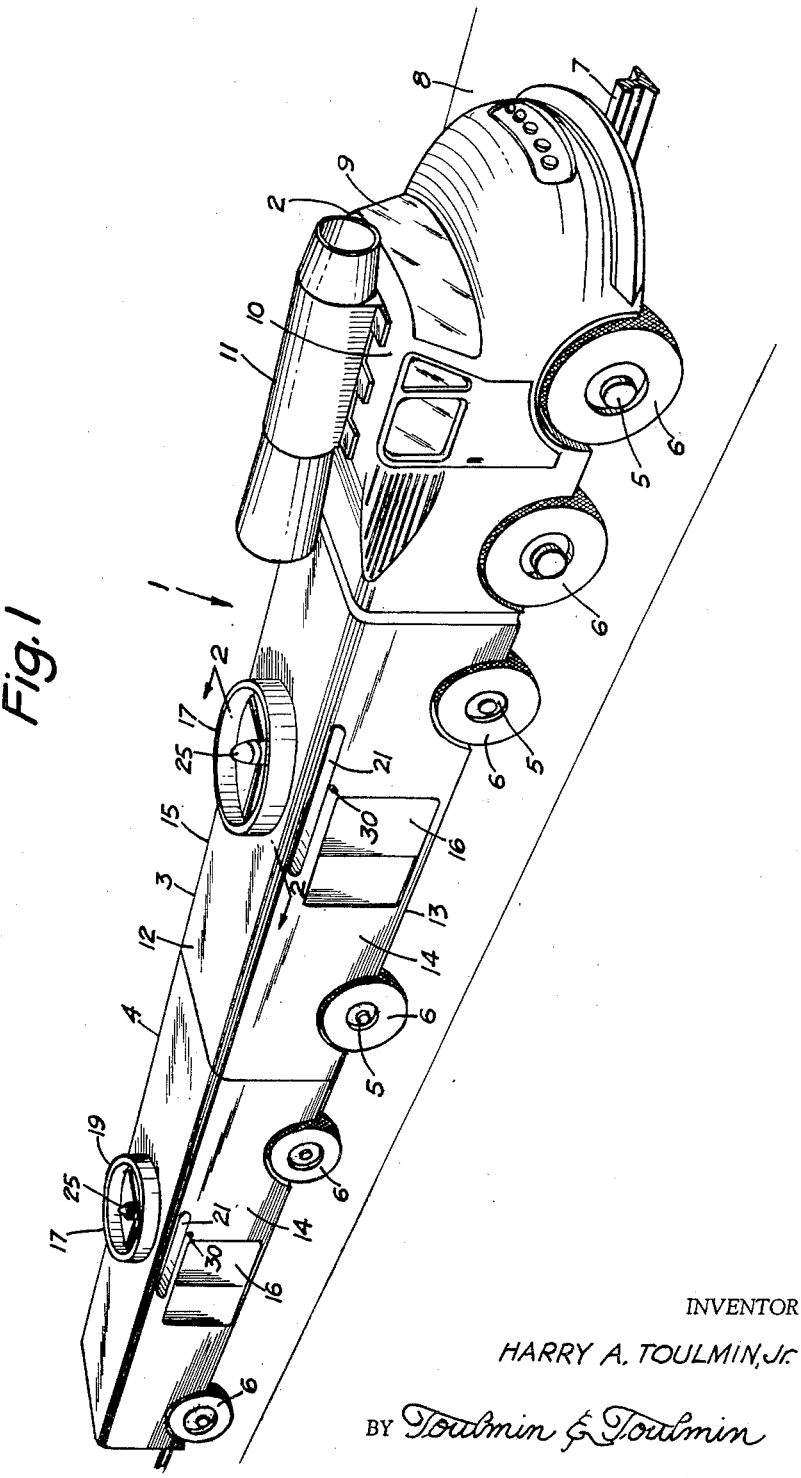
FIGURE 1 is an overall perspective view of the land vehicle constructed in accordance with the teachings of this invention.

Returning now to the drawings, more particularly to FIGURE 1 wherein like reference symbols indicate the same parts throughout the various views, 1 indicates generally a land vehicle constructed in accordance with the teachings of this invention. Vehicle 1 comprises a power and control cab 2 and cargo vehicles 3 and 4. Each of the components of the vehicle are mounted upon wheels 5 having rubber tires 6 which wheels straddle a single rail 7. The rail 7 is mounted in a road-bed 8. The road-bed 8 need not be as elaborate as a conventional highway, since at high speeds the road-bed will sustain very little of the weight of the vehicle in a manner which will be presently described.

The rail 7 may be a conventional railroad rail of the welded type wherein joints between the individual rails are eliminated.

The control car 2 of the vehicle comprises a control cab 9 having a top wall 10 upon which is mounted a turbo jet 11. The turbo jet 11 constitutes a source of power for propelling the vehicle and a rocket may be substituted therefor.

Each of the cargo vehicles 3 and 4 has a top wall 12, bottom wall 13 and side walls 14 and 15. Doors 16 are provided for admission to the interior of the cargo car.

Figure 2:
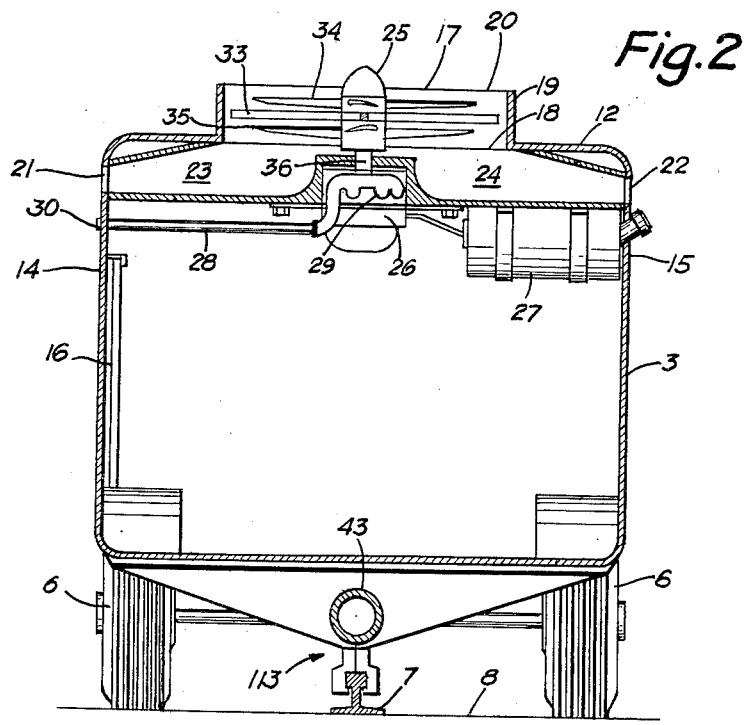
FIGURE 2 is a sectional view taken along the lines 2—2 of FIGURE 1.
Figure 4:
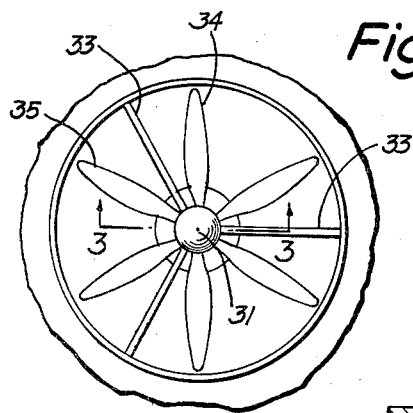
FIGURE 4 is a top plan view of the propeller shown in FIGURE 2.
Figure 3:
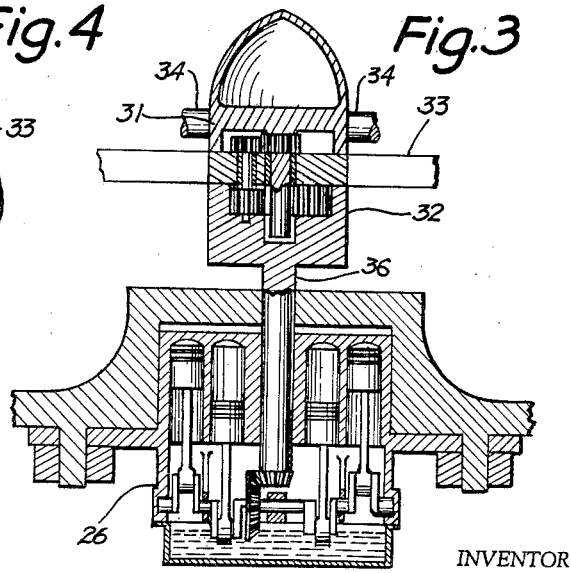
FIGURE 3 is a sectional view taken along the lines 3—3 of FIGURE 4 and in enlarged scale.

Proceeding next to FIGURE 2 there is illustrated lifting means 17 which is mounted in the top wall 12 of the cargo car 3 and is adapted for lifting the vehicle when the vehicle is being propelled under high speed and guided by the rail. The lifting means 17 comprises an opening 18 in the top wall 12 of the cargo car 3. An enclosure 19 having its top open, as indicated at 20, surrounds the opening 18. There are side openings 21 and 22 in the side walls 14 and 15 respectively. The openings 21 and 22 communicate through passages 23 and 24 with the top wall opening 18 and thence to the atmosphere through the opening 20 in the enclosure 19. A contrarotating propeller 25 is mounted in the enclosure 19. The propeller 25 is shown in FIGURES 3–5 and is powered through a suitable transmission from a power source 26 which comprises an internal combustion engine. Other forms of power, however, such as gas turbines, diesel engines or the like may be readily employed to rotate the propeller 25. A tank 27 which contains fuel for the prime mover 26 is mounted within the cargo car and an exhaust 28 leads from a manifold 29 of the prime mover to the side wall 14 where it discharges the exhaust gases to the atmosphere at 30.

Propeller 25 comprises an upper hub 31 and a lower hub 32, each of which contain gearing to permit the rotation of the hub components in opposite directions. The hubs 31 and 32 are supported by a plurality of arms 33 which are secured to the inner surfaces of the enclosure 19.

The upper hub 31 has three equally spaced propeller blades 34 attached thereto. Similarly, the lower propeller hub 32 has a like plurality of propeller blades 35 extending therefrom.

Also indicated in FIGURE 3 is the manner in which the internal combustion engine is drivingly connected to rotate the propeller 25. The prime mover 26 drives a drive shaft 36 which transmits power from the prime mover to the lower hub 32. Gear means within the hubs transmit power to the upper hub.

In FIGURE 6 there is illustrated a modification of the propeller lifting means disclosed in FIGURES 2 through 5. In this modification a propeller 37 is driven by a shaft 38 from a prime mover 39 which is mounted upon the top wall 12 of the cargo car. In this modification a much larger propeller may be employed since there is no enclosure surrounding the propeller. The lifting action of the modification of FIGURE 6 is quite similar to that employed by the conventional helicopter.

In FIGURE 7 there is illustrated another modification of lifting means for the cargo cars of this invention. In this modification a tubular member 40 is mounted between the top wall 12 and the bottom wall 13 of the cargo car. The tubular member 40 is open at both its upper and lower ends and a turbo jet 41 is mounted in the upper end of the tubular member. Operation of the turbo jet results in discharging the exhaust gases downwardly, as indicated at 42, to lift the cargo cars in a conventional manner when they are under way.

In FIGURE 8 there is illustrated the structure by which the wheels 5 of the locomotive 2 and the cargo cars 3 and 4 are supported from a running gear comprising a longitudinally extending tubular frame member 43 which is mounted beneath the bottom wall of the vehicle and is aligned with the longitudinal axis of the vehicle. The tubular frame member 43 is secured to the bottom wall of the vehicle by the mounts 44A, 44B and 44C.

A pair of steerable wheels, indicated generally at 45, are mounted upon articulated front axles 46 and 47, each of which has an inner supporting base 48 and extends laterally outwardly through opposed openings 49 and 50 in the tubular frame member 43. This mounting of the wheels and axles may be more clearly seen by referring to FIGURES 10 and 11 where it is noted that the supporting base 48 has a curved surface 51 which conforms to the curvature of the inner wall of the tubular frame member 43. The surface 51 is adapted to slidably engage the inner surface of the tubular frame member. The supporting base 48 has an upper contact surface 52 and a lower contact surface 53. The surfaces 52 and 53 are perpendicular to the axes of and opposite from the axles 46 and 47.

Referring to FIGURE 11 the outer end of the rear axle 47, as indicated at 54, has a spindle 55 thereon upon which the wheel 5 is suitably journalled on bearings indicated at 56. The wheel 5 also has hydraulic brakes 57 which are actuated by a hydraulic line 58 which leads to a source of hydraulic pressure. Except for the steering mechanism to be later described, both front and rear axle structures are similar.

The axles 46 and 47 are resiliently maintained in a laterally extending position with respect to the tubular frame member 43 by hydraulic motors 59 and 60 which are vertically spaced within the tubular frame member as illustrated in both FIGURES 10 and 11.

The hydraulic motors 59 and 60 comprise cylinders 61 and 62 which are fixedly mounted within the tubular frame member 43 and opposite the axle which said hydraulic motors are to actuate. Reciprocably received within the cylinders are pistons 63 and 64 to which are attached piston rods 65 and 66 which projects outwardly from the respective hydraulic motors and engage the axle contact surfaces 52 and 53 respectively, as shown in FIGURES 10 and 11.

Referring to FIGURES 10, 11 and 12, the upper hydraulic motor is larger in size than the lower hydraulic motor. This is necessary because of the normal position of the axles 46 and 47, pressure must be continually exerted by the upper hydraulic motor against the contact surface 52 to maintain the axles in a laterally extending position while supporting the weight of the vehicle, whereas when the axles are lifted only the weight of the wheels and axles must be raised, since the vehicle is either airborne or riding on the runners.

The various components of the hydraulic system to the hydraulic motors 59 and 60 are mounted beneath the tubular frame mount 44B and the system is schematically illustrated in FIGURE 12. The hydraulic system comprises a motor 67 which drives a hydraulic pump 68 to pump fluid from a reservoir 69 through a high pressure supply line 70S. A normally open valve 71 is connected to the supply line 70 by conduit 72 and delivers fluid under pressure through conduit 73 to the pressure side of the hydraulic motor 59. This pressure is sufficient to maintain the piston 63 in the position illustrated in FIGURE 12 which position will maintain the axle extending laterally from the tubular frame member 43 and will sustain the weight of the vehicle. Any surplus supply pressure is drained through a line 74 through a check valve 75 through a line 76 to a return line 70R which leads to the reservoir 69. The check valve 75 opens only at pressures above that necessary to maintain the weight of the vehicle. A normally closed valve 77 communicates with the conduit 73 by a line 78 and with the return line 70R by a line 79.

The valves connecting the hydraulic motor 60 are similarly arranged and comprise a normally closed valve 80 which is connected to the supply line 70S by conduit 81 to deliver fluid under pressure through conduit 82 to the pressure side of the hydraulic motor 60 when the valve 80 is opened. A line 83 from the conduit 82 leads to a check valve 84 which is connected by a line 85 to the return line 70R. A normally open bleeder valve 86 is connected by a conduit 87 to the conduit 82 and communicates with the return line 70R through line 88.

When it is desired to raise the wheels from contact with the surface a valve body 89, which has a sliding valve member 90, shown in FIGURE 13, is operated. The valve body 89 is shown as housing the valves 71, 75 and 77 connected to the hydraulic motor 59 but is the same for the valves 80, 84 and 86 connected to hydraulic motor 60. The valve member 90 is actuated by energizing a solenoid 91 mounted on the valve body 89. The valve member has passages 92A–C which communicate respectively with the conduits 78, 79; 72, 73; and 74, 76. The valve member 90 is shown in FIGURE 13 in its normal position corresponding to the valve positions in FIGURE 12. Energization of the solenoid 91 will move the valve member 90 to the left as viewed in FIGURE 13 to open the valve 77 and close the valves 71 and 75. Simultaneously therewith, the valve 80 is opened to admit fluid under pressure to the pressure side of the hydraulic motor 60. This will move the piston 64 outwardly and the action of the piston rod 66 on the lower contact surface 53 will raise the axle. At this time there is no pressure in the hydraulic motor 59.

As shown in FIGURE 14, the pair of wheels 45 may be equipped with mechanism to steer the vehicle when it is operated free of the rail. In the structure illustrated in FIGURE 14, axles 93 and 94 which are respectively similar to the axles 46 and 47 extend laterally outwardly from the tubular frame 43. The inner ends of the axles 93 and 94 are similar to the inner ends of the axles 46 and 47 and are similarly operated by an hydraulic system to pivot the axles with respect to the tubular frame member.

On the outer ends of the axles 93 and 94, as indicated at 95 and 96, there are pivotally mounted at 97 and 98 spindles 99 and 100. Steering arms 101 and 102 extend from the spindles 99 and 100 respectively and are linked by the arms 103 and 104 to a common link 105 which has one end 106 pivotally mounted upon a pin 107 which is fixedly positioned upon an arm 108 extending outwardly from the tubular frame 43.

The rear end of the link 105 is pivotally mounted at 109 by an arm 110 to a steering link 111 which has one end fixed to a hydraulic motor 112. The hydraulic motor 112 is actuated by a suitable hydraulic control system which is regulated from the control cab 9 of the land vehicle.

The land vehicle is attached to the rail 7 by rail gripping apparatus, indicated generally at 113 in FIGURES 8 and 15. The rail gripping apparatus 113 comprises a pair of annular mounting rings 114 and 115 which are mounted in tandem on the tubular frame member 43, as illustrated in FIGURES 8 and 9. The mounting rings 114 and 115 are pivotally mounted upon the tubular frame member and have depending arms 116 and 117 respectively, each of which have laterally extending grooves 118 and 119 which are shaped to grip the head of the rail 7, as shown in FIGURE 15. The vertical distance of the grooves 118 and 119 is greater than the height of the rail head which permits limited vertical movement of the clamping arms 116 and 117 when gripping the rail.

The mounting rings 114 and 115 have laterally extending arms 120 and 121 which are pivotally connected at 122 and 123 to piston arms 124 and 125 respectively. The piston arms are energized by hydraulic motors 126 and 127 respectively, which are pivotally mounted by pins 128 and 129 and brackets 130 and 131 to the underside of the vehicle.

The hydraulic motors 126 and 127 are connected to a hydraulic control circuit which is also regulated from the control cab 9 of the vehicle. Energization of the electric motors will result in clamping and unclamping of the rail by the rail gripping apparatus, as indicated in FIGURES 16 through 18.

When the vehicle is operating upon land at normal speeds, the clamps will be open in a position as illustrated in FIGURE 16. When the vehicle is to be run at high speed upon a rail, the rail gripping apparatus will be closed, as illustrated in FIGURE 17, to permit the clamping arms to grip the rail, as illustrated therein. When the vehicle has attained full speed, the wheels are lifted in the manner as previously described to the position illustrated in FIGURE 18 and the vehicle is guided along the rail solely by the rail gripping means, also shown in FIGURE 18.

The operation of the rail gripping apparatus may be coordinated with the wheel raising control system whereby when the control to raise the wheels is energized, the rail gripping apparatus will clamp the rail prior to the response of the wheel raising apparatus to the controls.

While it is possible to employ the land vehicle of this invention to the conventional railroad rail, a modified form of the rail, as shown in FIGURE 19, may also be employed. In the modified rail form, indicated at 132, the head 133 is substantially circular in cross section and the grooves and the modified clamping arms 134 and 135 of the rail gripping apparatus are curved to conform to the outline of a circular rail head. The remaining structure of the rail gripping apparatus is similar to that previously described in connection with the structure illustrated in FIGURE 15 through 18.

In FIGURE 20 there is illustrated a modification of the rail vehicle of this invention, wherein lifting of the vehicle above the rails is achieved by means of a plurality of lifting surfaces having air foil sections. FIGURE 20 illustrates a vehicle 136 having rubber tired wheels 137 which straddle a rail 138. Rail gripping apparatus similar to that described above is employed to guide the vehicle upon the rail 138.

The vehicle 136 is propelled by turbo jets 139 and 140 which are mounted on the roof of the vehicle. Multiple lifting surfaces 141 and 142 are positioned both in front of and to the rear of the turbo jets 139 and 140.

Each of the lifting structures 141 and 142 comprises a plurality of wing-like lifting surfaces 143. The lifting surfaces 143 have a pronounced stagger and have an air-foil cross section which is suitable for high speed travel.

The angle of incidence of the lifting structures 141 and 142 may be adjusted by the structure illustrated in FIGURE 21. In FIGURE 21 a vertical supporting member 144 which connects the lower lifting surface 143 of each of the lifting structures is pivotally mounted by a pin 145 which is supported in the brackets 146. The brackets and pin are enclosed by a streamlined housing 147 which has an opening 148 through which the support member 144 extends.

A sector gear 149 is fastened upon the lower end of the vertical supporting member 144. The sector gear 149 meshes with a worm 150 mounted upon a shaft 151 which is driven by a reversible electric motor 152 mounted by a bracket 153 from the top wall of the vehicle.

In FIGURE 22 there is illustrated indicating means which reveals the angle at which the wing structure is positioned. The indicating means comprises an arm 154 which extends from the sector gear 149. There is an electrical contact 155 at the end of the arm 154 which contacts a resistance 156 to function as a potentiometer. A source of current is provided by a battery 157 and the current flowing through the circuit is indicated on a calibrated scale 158 by a pointer 159 on the wing angle indicator 160. Varying the angle of the lifting structure will position the contact 155 along the resistance 156. The variation in the resistance will vary the current flowing through the indicator circuit. The scale 158 is calibrated in degrees which correspond to the current flowing therethrough. Consequently, the angle at which the lifting surfaces are positioned is read directly from the instrument 160.

The wing angle indicator 160 is mounted in an instrument panel 161 illustrated in FIGURE 23. The instrument panel 161 may be employed in either embodiment of the land vehicle.

The instruments and controls for the engines are conventional and are as indicated on that portion of the control panel reserved for engine control and indicated at 162. A speedometer 163 surmounts the panel 161.

The wheels are adjusted to the raised or lowered position by the operating handle 164 which is moved to either of the indicated positions. Colored signal light indicators 165 and 166 are employed to indicate the up and down positions respectively of the wheels. The pressure of the wheel hydraulic system is indicated by the pressure gauge 167. When the pressure falls below a predetermined minimum, the hydraulic pump is energized by actuation of the switch 168.

The rail gripping clamps are operated by a control lever 169 by positioning the lever, as indicated. The temperature of the clamps resulting from their frictional contact with the rail is indicated on the gauges 170.

An operating handle 171 is provided to energize the electric motor 152 to vary the angle of incidence of the lifting surfaces 143. As previously described, the angle of incidence is indicated on the gauges 160.

In operation, the land vehicle of this invention may be driven along the highway as a conventional automobile. However, for high speed transportation a single rail structure may be employed. The vehicle is driven to enable the wheels to straddle the rail and the rail gripping apparatus is operated to close the clamps about the rail. The vehicle is then propelled along the rail by either turbo jets or rockets until full speed is attained. At this time the lifting structure, which may comprise either propellers, turbo jets or wings, lift the vehicle a limited amount as determined by the play between the rail clamps and the rail. Consequently, the major portion of the weight of the vehicle will be removed from the rail. This will permit high speed operation of the vehicle and will eliminate a substantial amount of friction generated by the engagement of the rail clamps and the rail.

Since a major portion of the weight of the vehicle is borne by the rail when the vehicle is operating at full speed, it is not necessary to provide expensive and elaborate road structures to support the vehicle wheels. The result is a high speed land vehicle which can carry cargo or personnel and which may operate either upon a conventional highway or rail.

This application is a division of the copending application by the same named inventor filed Dec. 7, 1955 and having Serial No. 551,662, now U.S. Patent 2,969,751.

It will be understood that this invention is susceptible to modification in order to adapt it to different usages and conditions, and, accordingly, it is desired to comprehend such modifications within this inventon as may fall within the scope of the appended claims.

What is claimed is:

1. A self-propelled land vehicle adapted for guidance by mono-rail means mounted on the ground and comprising a vehicle body having wheel means for supporting the vehicle on the ground, propulsion means comprising jet motor means mounted on said vehicle body for propelling the vehicle, means on said vehicle body for lifting the vehicle, and guide means mounted on said vehicle body and arranged for loosely engaging said mono-rail means and limiting both the vertical and lateral movement of said vehicle with respect to said mono-rail means and to maintain the vehicle in engagement with said mono-rail means.

2. A self-propelled land vehicle for travelling on a mono-rail means located on the ground and adapted to travel on air while guided by said rail means, wheel means on said land vehicle for supporting the vehicle on the ground, means comprising jet motor means mounted on said vehicle for propelling the vehicle while guided by said rail means, means comprising a motor driven propeller mounted on said vehicle for lifting the vehicle by a downwardly directed column of air, guide means on said vehicle and arranged for loosely engaging said rail means and limit both the vertical and lateral movement of said vehicle with respect to said rail means and to maintain the vehicle in engagement with said mono-rail means.

3. A self-propelled land vehicle for travelling on a mono-rail means located on the ground and adapted to travel on air while guided by said mono-rail means, means on said land vehicle for supporting the vehicle on the ground, means comprising jet motor means mounted on said vehicle for propelling the vehicle while being guided by said mono-rail means, a vertically extending tubular member within said vehicle and opening at the bottom portion thereof, reaction propulsion means mounted within said tubular member to direct a column of air downwardly through said tubular member to lift the vehicle, and guide means on said vehicle and arranged for loosely engaging said mono-rail means to thereby limit both the vertical and lateral movement of said vehicle with respect to said mono-rail means and hold the vehicle in engagement with said mono-rail means.

4. A self-propelled land vehicle for travelling on a mono-rail means located on the ground and adapted to travel on air while being guided by said rail means, propulsion means mounted on said vehicle for propelling the same, reaction propulsion means mounted on said vehicle for producing a downwardly directed column of air to lift the vehicle, and guide means on said vehicle and arranged for loosely engaging said rail means and limiting both the vertical and lateral movement of said vehicle with respect to said rail means and to maintain the vehicle in engagement with said mono-rail means.

References Cited in the file of this patent

UNITED STATES PATENTS

| | | |
|---|---|---|
| 867,765 | Strickler | Oct. 8, 1907 |
| 933,914 | Neville | Sept. 14, 1909 |
| 1,415,400 | Roghmanns | May 9, 1922 |
| 1,468,508 | Nilsson | Sept. 18, 1923 |
| 1,603,393 | Malcolm | Oct. 19, 1926 |
| 1,698,482 | Nicin | Jan. 8, 1929 |
| 2,942,557 | Hirsch et al. | June 28, 1960 |
| 3,006,288 | Brown | Oct. 31, 1961 |